United States Patent
Bacher et al.

(10) Patent No.: US 6,202,815 B1
(45) Date of Patent: Mar. 20, 2001

(54) FRICTION CLUTCH WITH LOW DISENGAGING FORCE

(75) Inventors: Michel Bacher, Andilly; Jacques Thirton De Briel, Colombes; Michael Graton, Paris; Andre Dalbiez, Argenteuil; Michel Blard, Issy-les-Moulineaux; Hugues Minereau, Stains, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/068,089

(22) PCT Filed: Sep. 5, 1997

(86) PCT No.: PCT/FR97/01564

§ 371 Date: Aug. 18, 1999

§ 102(e) Date: Aug. 18, 1999

(87) PCT Pub. No.: WO98/10201

PCT Pub. Date: Mar. 12, 1998

(30) Foreign Application Priority Data

Sep. 6, 1996 (FR) .................................. 96/11009
Apr. 7, 1997 (FR) .................................. 97/04213
Apr. 7, 1997 (FR) .................................. 97/04214

(51) Int. Cl.[7] ............................. F16D 13/58; F16D 13/50
(52) U.S. Cl. .................................. 192/70.25; 192/111 A; 192/89.23; 192/89.24
(58) Field of Search ............................. 192/70.25, 111 A, 192/89.23, 89.24

(56) References Cited

U.S. PATENT DOCUMENTS

| 4,949,829 | * | 8/1990 | Tojima et al. | 192/70.27 X |
|---|---|---|---|---|
| 5,186,298 | | 2/1993 | Takeuchi . | |
| 5,551,547 | * | 9/1996 | Mizukami et al. | 192/889.23 |
| 5,730,267 | * | 3/1998 | Lopez | 192/70.27 |
| 5,816,379 | * | 10/1998 | De Briel et al. | 192/70.25 |
| 5,855,267 | * | 1/1999 | Giroire et al. | 192/70.27 |
| 5,967,283 | * | 10/1999 | Kemper | 192/89.23 |
| 6,016,897 | * | 1/2000 | Bacher | 192/70.27 |

FOREIGN PATENT DOCUMENTS

| 4311286 | 10/1993 | (DE) . |
|---|---|---|
| 4326501 | 2/1994 | (DE) . |
| 0537088 | 4/1993 | (EP) . |
| 0718517 | 6/1996 | (EP) . |
| 0779446 | 6/1997 | (EP) . |
| 1392569 | 2/1965 | (FR) . |
| 2176388 | 10/1973 | (FR) . |
| 2684151 | 11/1992 | (FR) . |
| 2739159 | 3/1997 | (FR) . |
| 2741917 | 6/1997 | (FR) . |
| 2753756 | 3/1998 | (FR) . |
| 943039 | 11/1963 | (GB) . |
| 9719275 | 5/1997 | (WO) . |

* cited by examiner

Primary Examiner—Charles A Marmor
Assistant Examiner—Saúl Rodriguez
(74) Attorney, Agent, or Firm—Liniak, Berenato, Longacre & White

(57) ABSTRACT

A friction clutch for a motor vehicle having a clutching friction member and clutching mechanism with a cover and a clutch thrust plate. A resilient clutch member and disengaging gear is disposed between the rear surface of the thrust plate and the cover for moving the clutch thrust plate towards the cover. The clutch is provided with a wear adjustment device, a resilient servo member and a resilient smooth engagement member. The resilient servo member is mounted outside the clutching friction member. The load pressure feature combining the load pressure features of the resilient servo member and smooth engagement member globally follows the load pressure feature of an axially operating resilient clutching member.

25 Claims, 2 Drawing Sheets

FRICTION CLUTCH WITH LOW DISENGAGING FORCE

The present invention concerns friction clutches with low declutching force, notably for motor vehicles.

DESCRIPTION OF THE RELATED ART

As is known, in a conventional clutch interposed between input shaft and an output shaft, a diaphragm bears on the bottom of a cover, fixed to a flywheel driving in rotation, in order to move a thrust plate in the direction of the said flywheel, forming a reaction plate, in order to grip the friction linings of a clutch friction member between the said thrust and reaction plates.

The driving flywheel is fixed to a first shaft, such as an input shaft, whilst the clutch friction member has at its inner periphery a hub for fixing it, with respect to rotation, to a second shaft, such as an output shaft.

The clutch is therefore normally engaged, or clutched, with transmission of torque between the input and output shafts.

In order to disengage, or declutch, the clutch, it is necessary, by means of a clutch release bearing, to act axially by pushing, in the case of a clutch of the pushed type, on the inner end of the fingers of the diaphragm in order to cause the said diaphragm to pivot and to cancel out the force exerted by this diaphragm on the axially movable thrust plate in order to release the friction linings. The torque is then no longer transmitted from the input shaft to the output shaft since the friction linings are no longer gripped between the thrust and reaction plates fixed to the cover with respect to rotation.

Normally, the cover, the thrust plate and the diaphragm form a unitary assembly referred to as a clutch mechanism which is attached by its cover to the flywheel, elastic tongues connecting the thrust plate to the cover with respect to rotation, with axial mobility.

The diaphragm, as is known, has a central hole and has an outer peripheral part in the form of a Belleville washer extended inwards by a central part divided into radial fingers by slots. This diagram, through its Bellville washer part, bears on the cover and on the thrust plate. Thus the declutching device of the clutch, which makes it possible to counteract the action of the clutching elastic means at will, is formed by the fingers of the diaphragm on the inner end of which the clutch release bearing acts, whilst the Bellville washer of the diaphragm constitutes axially acting clutching elastic means for gripping the friction linings between the thrust and reaction plates and therefore to act axially on the thrust plate in the opposite direction to the bottom of the cover.

In the free state, this diaphragm has a frustoconical form. Once mounted in the clutch, its Bellville washer is mounted under prestressing and is more or less flattened. During the operation of declutching, or disengaging, the clutch, the clonicity of its Bellville washer is modified.

As is known, the characteristic curve of this diaphragm, which represents the force exerted as a function of the movement, for example referred to the level of the inner end of the diaphragm fingers, is determined by the dimensions of its Bellville washer, notably by the ratio between the height of the truncated cone of the Bellville washer in the free state and the thickness of the diaphragm.

This characteristic curve passes through a maximum.

Thus the force to be exerted on the inner end of the diaphragm fingers increases up to a maximum, gradually decreases to a minimum, and then increases once again. The difference between the maximum and minimum can be great. For more information on this characteristic curve, reference should be made for example to the documents FR-A-1 392 569 and WO 97/19 275.

In the document FR-A-1 392 569, an elastic progressive action device was provided to avoid passing through the aforementioned maximum during the declutching travel. This device is mounted in series with the Bellville washer of the diaphragm and has an elastic force appreciably less than that of the Bellville washer. This device has a limited travel between a prestressed position where its force is at a maximum and a stressed position where its force is at a minimum.

With this arrangement, a declutching force is obtained which is increasing overall at the clutch release bearing.

During the declutching travel it is not possible to obtain as great an assistance as desired, the progressive action device reducing the load exerted by the diaphragm on the thrust plate during declutching.

The load curves of the progressive action device, when it is mounted within the friction member, and of the diaphragm, have shapes which do not make it possible to combine them in order to obtain high assistance for declutching, in particular if it is wished to respect declutching travels and forces compatible with the current declutching controls. Moreover, the shape of the curve of the progressive action device changes, notably because of phenomena of encrustation of the friction linings, very rapidly with the life of the clutch, and the higher the assistance level required, the more this cancels out the assistance for declutching. In order to prevent ageing of the curve of the assistance device, it is preferable to place the latter at a point where its stiffness curve will remain stable over time and, in particular, at a point placed outside the progressive action zone of the friction member where the lining contact and the phenomenon of encrustation change and cause the progressive action curve to change.

It can then be considered using an assistance spring.

Thus, in the certificate of addition 86 983 to French patent 1 392 569, it has already been proposed to interpose, between the elastic washer of the diaphragm and the thrust plate, an auxiliary elastic washer, the said two elastic washers being placed in series; the auxiliary elastic washer allows a certain amount of progressiveness in the engagement of the clutch and procures a certain degree of assistance force during its disengagement.

In the document U.S. Pat. No. 5,186,298, a friction clutch including a device for taking up wear and a progressive action device mounted within the friction member has already been proposed; in the document FR-A-2 684 151, a clutch of the same type has already been proposed in which the load curves of the progressive action device and of the diaphragm are combined in order to obtain high assistance on declutching; unfortunately, for the reasons indicated above, such an arrangement is not suitable.

SUMMARY OF THE INVENTION

The object of the present invention is to create, simply and economically, a friction clutch equipped with a device for taking up wear and a progressive action device mounted within the friction member, with a low declutching force, having recourse to springs acting in series without appreciably decreasing, throughout the life of the clutch, the force for gripping the friction linings in the state with the clutch engaged.

Thus, according to the invention, a friction clutch, notably for motor vehicles, has a clutch friction member and a clutching mechanism having a cover with a transversely oriented bottom and fixing means for fixing the clutching mechanism to a flywheel driving in rotation, a thrust plate having at the front a friction face for cooperating with the clutch friction member, elastic tongues for connecting the thrust plate with the cover with respect to rotation, with axial mobility, and, interposed between the back face of the thrust plate and the bottom of the cover, on the one hand axially acting elastic clutching means axially forcing the thrust plate in the opposite direction to the bottom of the cover and on the other hand a declutching device for counteracting the action of the said elastic clutching means as required and moving the thrust plate in the direction of the bottom of the cover over a so-called plate lifting distance, the clutching mechanism being equipped with a device for taking up wear on at least one of the linings of the clutch friction member and elastic assistance means for assisting the declutching force, elastic progressive action means being mounted within the clutch friction member and acting axially only on a travel of the thrust plate, is characterised by the fact that the elastic assistance means are mounted outside the clutch friction member and the load/compression characteristic combining the load/compression characteristics of the elastic assistance and progressive action means follows overall the load/compression characteristic of the axially acting elastic clutching means.

This is the difference between these two characteristics which represent the change in the force to be supplied in order to declutch the clutch; this may be low, since these characteristics may be close to each other; it may be constant if these are parallel, one following another to within a constant; it may be slightly increasing when they are not strictly parallel.

The progressive action device mounted within the friction member enables the latter, or more exactly the linings carried by the latter, to adapt geometrically to the friction faces of the reaction plate and pressure plate which, notably, under the effect of temperature rises due to friction, deform, the most usual deformation being adopting a cone shape; by virtue of the progressive action device, the friction linings follow these deformations whilst adapting to them, so that wear on the said linings is reduced. It is however important to note that these deformations do not have a very great amplitude axially, and a progressive action device tolerating an adaptation of the friction linings of three to four tenths of a millimeter, measured axially, is sufficient; thus, for a lifting of the thrust plate of around 1.2 millimeters, it can be seen that the progressive action device acts at most only when one side of this lifting has taken place. Naturally, this depends on the application.

The aim of the invention is also to take advantage of this finding: advantageously, the elastic progressive action means act axially only over a travel of the thrust plate which is at least equal to one third of the lifting of the plate.

By virtue of this arrangement, there is less risk of the contribution of the progressive action means to the assistance force interfering with the value of the latter in use.

Advantageously, the elastic clutching means and the elastic assistance means each consist of a Belleville washer, the two Belleville washers being mounted in series and placed axially between the thrust plate and the bottom of the cover.

Preferably, the first Belleville washer is referred to as the negative Belleville washer, its load supplied decreasing when the height of its truncated cone decreases, and the second Belleville washer is referred to as the positive Belleville washer, its load supplied increasing when the height of its truncated cone decreases.

Advantageously, the thrust plate has at its rear an abutment situated radially below the stop zones in order to limit the inclination of the first Belleville washer and prevent it turning.

Preferably, force transmission means are interposed between the inner peripheries of the first and second Belleville washers.

Advantageously, the Belleville washers are kept in contact with the force transmission means by an elastic clamp, optionally divided, coming into engagement with the external faces of the Belleville washers.

According to one embodiment, the declutching device is annular in shape and the two Belleville washers are mounted in series between the thrust plate and a manoeuvring stop carried by the declutching device which is mounted at its outer periphery so as to pivot on a primary stop carried by the bottom of the cover radially above the manoeuvring stop, itself located radially above a secondary stop carried by the bottom of the cover; the device for taking up wear having ramp means with ramps disposed circumferentially and stop zones, the first Belleville washer is in contact at its outer periphery with the stop zones, whilst the second Belleville washer bears at its outer periphery on the manoeuvring stop, the said washers being inclined in opposite directions; the declutching device has a peripheral part of annular shape extended by a main part divided into radial fingers by slots; the manoeuvring stop is formed by stamping and is connected to the inner periphery of the annular peripheral part of the declutching device by a dished part directed axially in the opposite direction to the manoeuvring stop; the peripheral part of the declutching device is offset axially with respect to its main part; the primary stop is offset axially with respect to the secondary stop.

Advantageously, the force transmission means consist of a spring ring.

According to another embodiment, the device for taking up wear having ramp means with ramps disposed circumferentially and stop zones, the first Belleville washer is in contact with the stop zones, whist the second Belleville washer bears on the cover; preferably, the first washer is in contact through its outer periphery with the stop zones whist the second washer bears through its outer periphery on the cover; the force transmission means are carried by the declutching device.

As a variant, the first washer is in contact through its median part with the stop zones whilst the second washer bears through its inner periphery on the cover.

According to another variant the first washer is in contact with the stop zones through its inner periphery whilst the second washer bears on the cover through its inner periphery.

Advantageously, the bottom of the cover carries an abutment for limiting the inclination of the second Belleville washer.

Preferably, the second elastic washer is the outer peripheral part of a diaphragm extended inwards by a central part divided into radial fingers by slots.

According to one embodiment, the declutching device comprises a transverse plate carrying at its outer periphery the force transmission means and connected by its inner periphery to a sleeve mounted so as to slide axially.

According to another embodiment, the declutching device comprises an annular disc carrying in its radially median part the force transmission means and having, at its outer periphery, lugs passing through openings formed in a cylindrical peripheral skirt on the cover, the lugs on the annular disc being adapted to bear on an edge of these openings when the adjacent part of its inner periphery of the annular disc is moved axially.

According to yet another embodiment, the declutching device comprises a disc having an annular part extended towards the axis by a central part divided into radial fingers by slots, the force transmission means being placed at the outer periphery of the said annular part, itself mounted so as to be articulated on the inner periphery of the bottom of the cover.

Advantageously, the device for taking up wear is actuated by the elastic clutching means.

According to another variant, the device for taking up wear is actuated by the force transmission means.

The description which follows illustrates the invention with regard the accompanying drawings in which;

DETAILED DESCRIPTION OF PREFERRED EMBODIMENT

Figure 1:
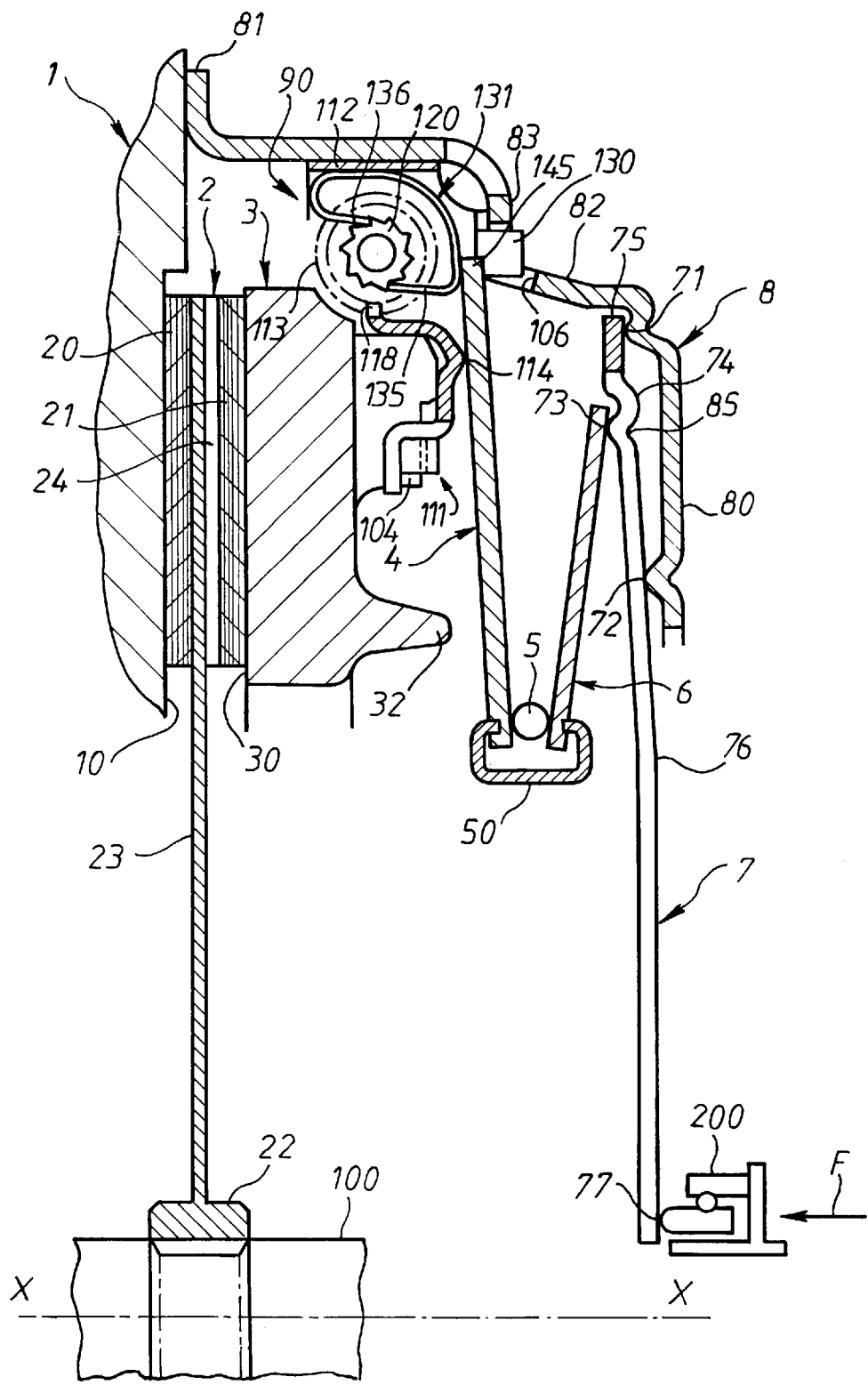
FIG. 1 is a half view in axial section of a clutch according to the invention in the clutch engaged position.

The clutch of the pushed type depicted in FIG. 1 is of the type described in the French patent application filed on Sep. 6, 1996 under the number 96 11 009, the description of which is to be considered as forming part of it. Overall, such a clutch includes a set of parts of annular shape, namely in axial succession a flywheel 1 for driving in rotation, for fixing the clutch to a first shaft, such as an input shaft, a clutch friction member 2 having at its outer periphery friction linings 20, 21 and at its inner periphery a hub 22 for connecting the clutch in rotation with a second shaft, such as an output shaft, a thrust plate 3, a first Belleville washer 4, a stop spring ring 5, a second Belleville washer 6 inclined in the opposite direction compared with the first Belleville washer 4, a declutching device 7 of annular shape, a cover 8 of annular shape having a bottom 80 overall of transverse orientation with a central hole and at its outer periphery fixing means 81 for fixing the cover 8 to the flywheel 1 forming a reaction plate.

The flywheel 1 has at its rear a friction face 10 and is depicted here partially, knowing that, in a known fashion, it has holes centrally for fixing it to the input shaft by means of screws. Here, the flywheel 1 is made in a single piece, whilst being made of castable material, just like the thrust plate 3 having at its front a friction face 30 facing the friction face 10 of the flywheel 1. The flywheel 1 and thrust plate are here made of cast iron or any other material suited to dry friction.

The clutch friction member 2 has a support disc 23 for carrying the friction linings 20, 21, optionally divided. These linings 20, 21 extend on each side of the support disc 23 whilst being fixed to it for example by riveting. Here the linings 20, 21 are fixed by bonding or brazing to the metallic support disc 23.

Axially acting elastic progressive action means 24 are interposed between the two linings 20, 21 for progressive clamping thereof between the flywheel 1 and thrust plate 3. These means can have any appropriate shape. Here these means 24 are produced by shaping the support disc 23. This disc, non-limitatively, can have a central part for connecting it, elastically or not, to the hub 22, and a peripheral part divided into radial blades for example of the tripod type. Each blade then has a central bearing zone intended for fixing one of the friction linings 20, 21 and two outer peripheral bearing zones intended to cooperate with the other one of the friction linings 21, 20.

The bearing zones are offset axially with respect to the central part of the disc 23, the central bearing zone, of large extent, being connected to the said central part by a tangential fold, whilst the peripheral bearing zones are connected to the said central bearing zone by oblique folds. For more information, reference should be made to the document U.S. Pat. No. 5,452,783, also showing an embodiment with friction linings divided into studs. In this way the phenomena of encrustation of the linings 20, 21 in the blades are minimised. Thus the elastic progressive action means are more stable over time.

As mentioned above, the disc 23 can be coupled elastically to the hub 22. As a variant, the disc 23 is coupled rigidly to the hub 22, the flywheel 1 then being divided so as to have two masses coupled elastically to each other by circumferentially or radially acting springs.

As a variant, the flywheel 1 can be in two parts and have a support flange fixed at its inner periphery to the input shaft and at its outer periphery to a reaction plate having the friction face 10. The cover 8 can then be connected to the flywheel 1 in two parts by means of axially oriented lugs issuing from its cylindrical peripheral skirt 82. These lugs, in the form of tenons, are then engaged in mortises formed at the outer periphery of the reaction plate or of the support flange. The free section of the lugs, forming the aforementioned fixing means 81 of the cover 8, can be fixed by crimping, folding over or welding to the flange or to the reaction plate, as described for example in the French patent application 95 12523 filed on Oct. 24, 1995 and published under the number FR-A-2 741 917.

Here the cover 8 has a conventional form and the fixing means 81 consists of a radial shoulder on the cover 8, directed radially in the opposite direction to the axial axis of symmetry of the clutch, the said shoulder 81 being provided with holes, not visible, for mounting members, such as screws or as a variant rivets, for fixing the shoulder 81 to the flywheel 1.

Where it is a case of an application to a motor vehicle, the input shaft is here the drive shaft of the vehicle on the crankshaft of which the flywheel 1 is fixed, whilst the output shaft consists of the input shaft of the gear box depicted partially at 100 in FIG. 1.

Naturally, it is possible to reverse the structures, the first shaft being able to be an output shaft and the second shaft an input shaft.

The thrust plate 3 is connected in rotation with the hollow-shaped cover 8 by elastic tongues, not visible in the figure, enabling the thrust plate 3 to move axially with respect to the cover 8. The thrust plate 3 is therefore fixed with respect to rotation to the cover 8 and flywheel 1, whilst being axially movable with respect to them.

Here the outer cylindrical skirt 82 of the cover 8, connecting the bottom 80 to the radial fixing shoulder 81, has holes locally for the passage of lugs, which the thrust plate 3 has in radial projection. The tangential elastic tongues are fixed at one of their ends to the lugs and at their other end to a radial area 83 on the cover. These elastic tongues are distributed regularly on the circumference, in a known fashion; their number, like that of the lugs, depends on the application, knowing that, for private cars, generally three groups of elastic tongues are used. As a variant, the tongues can be inclined or of radial orientation. In all cases, they exert an axially oriented restoring force.

The fixing thereof to the areas 83 and the lugs is achieved by means of fixing members, usually rivets, or as a variant screws or bolts.

The first Belleville washer 4, adjacent to the thrust plate 3, bears at its outer periphery on bearing zones 114 described below.

This washer 4 is inclined in the direction of the cover 8, its concavity being directed towards the thrust plate 3.

The second Belleville washer 6, adjacent to the declutching device, bears at its outer periphery on the declutching device 7 which, for this purpose, has an annular stop 73. The second Belleville washer 6 is inclined in the direction of the thrust plate 3, in the opposite direction to the first washer 4, its concavity being directed towards the bottom 80 of the cover 8.

The two Belleville washers 4 and 6 thus have a V-shaped in cross section, whilst being in contact at their inner periphery with the annular force transmission spring ring 5 interposed between them.

More precisely, under the conditions described below, one of the Belleville washers provides the clamping of the clutch and is designated below as the clamping washer; the other Belleville washer provides assistance for declutching and is designated below as assistance washer.

The clamping washer, like the Belleville washer part of a diaphragm, is such that the load which it procures increases with the height of the truncated cone which it represents; the assistance washer is such that the load which it procures decreases with the height of its truncated cone; the two washers working in the area of their practically linear load/compression characteristic curve, it is seen that, by choosing washers whose curves are, in these areas, practically parallel, the declutching force, which at each position of the declutching device is equal, or proportional, to the difference between the loads of the washers, is small and practically constant; as a variant, if the stiffness of the clamping washer is greater than that of the assistance washer, it is possible to obtain a declutching force which is low but increasing slightly with the declutching travel. These characteristic curves here take account of the force due to the elastic progressive action means 24 of the friction member 2, and theoretically of the force due to the elastic tongues, but the latter is negligible, these forces, as is known, acting in the direction of the declutching and participating in the assistance for declutching. For more information, reference should be made to the document WO 97/19 275, and notably to FIG. 4 where the variation in clonicity of a Belleville washer is depicted.

Thus the positive washer has an area of use which, considering the characteristic curve of a diaphragm is situated originally overall at the maximum of the said curve, whilst the area of use of the negative Belleville washer is situated beyond the said maximum, as mentioned in the document WO 97/19 275.

The stop 73 of the declutching device 7 constitutes a manoeuvring stop as described below.

Here, the declutching device 7 is metallic and the stop 73 is produced by stamping, being of rounded shape.

These Belleville washers 4, 6 are of course dimensioned so that an equilibrium is produced in combination with the elastic progressive action means 24 when the clutch is in the engaged position, the position depicted in FIG. 1.

Advantageously, the washers 4, 6 are hollowed locally, here by forming, in order to receive the spring ring 5. The outer face of these washers 4, 6 is grooved in order to hold a U-shaped clamp 50, the free ends of whose arms are of axial orientation. The clamp 50 extends by its bottom radially below the washers 4, 6.

The clamp 50, here of annular shape, is elastic and elastically clamps the washers in contact with the spring ring 5 whilst being in contact through its arms with its outer face of the said washers. This clamp 50 can as a variant be divided into clips. According to the inclination of the washers 4, 6, the clamp opens or closes.

The declutching device 7, here metallic, is able to bear locally at its outer periphery on an annular-shaped primary stop 71 formed by stamping at the outer periphery of the bottom 80 of the cover 8, here made of stamped metal sheet. This cover 8 has, at the inner periphery of its bottom 80, with a central hole, a secondary stop 72 of annular shape formed by stamping.

The declutching device 7 is able to come locally in contact on this primary stop 71 forming a pivoting stop. The primary stop 71 is offset axially in the direction of the shoulder 81 and of the thrust plate 3 with respect to the secondary stop 72.

Thus, in the clutch engaged position, the declutching device 7 bears on the secondary stop 72. The manoeuvring stop 73 of the declutching device is located radially between the primary 71 and secondary 72 stops. Naturally, the stops 71 to 73 can be replaced by annular spring rings, the cover 8 and the declutching device 7 then being hollowed for this purpose.

In all cases, the stops 71 to 73 are carried respectively by the bottom 80 of the cover 8 and the declutching device 7.

It will noted that the outer periphery 75 of the declutching device 7 is offset axially with respect to the main part 76 of the said declutching device 7 in order, in combination with the offset of the primary stop 71, to reduce the axial dimension. This offset of the peripheral part 75 is produced by locally dishing the declutching device 7 at 74, in the direction of the bottom 80 of the cover. This dishing 74 connects the peripheral part 75 to the manoeuvring stop 73 so that the peripheral part 75 is connected to the main part 76 by an annular portion roughly in the shape of a reversed S. It will be noted that the dish 74 also makes it possible to radially hold and centre the second washer 6. The dish 74 is directed axially in the reverse direction compared with the manoeuvring stop 73 and stiffens the area lying between the manoeuvring stop 73 and the peripheral part 75 of the declutching device 7.

All this is possible since the declutching device 7 does not appreciably exert any elastic action axially, its load being low.

In order to ensure perfect consistency of the clamping force, the clutching mechanism is equipped with a device for taking up wear such as the device 90; the device 90 was described in detail in the French patent application filed on Sep. 17, 1996 under the number 96 11 297, to which reference should be made for more information, and the corresponding description should be considered to form part of the present application; its constitution will simply be repeated.

The device for taking up wear 90 comprises circumferentially disposed ramp means 111 consisting of an annulus made of cutout sheet metal and dished so as to exhibit circumferentially disposed ramps; the said annulus also has stop zones as 114 consisting of the rounded top edge of dishes in the form of arcs of a circle centred on the axis of the clutch and here placed radially towards the outside with respect to the ramps.

The thrust plate 3 has, here moulded in one piece, on its face turned towards the bottom of the cover 8, studs 104 distributed circumferentially at a distance from each other which corresponds to that which circumferentially separates two successive ramps, the studs 104 being intended each to cooperate with a ramp.

The ramp means 111 are placed axially between the first washer 4 and the thrust plate 3 so that the studs 104 receive the ramps and the first washer 4 cooperates with the stop zones 114 which thus constitute the stop means by means of which the washers 4 and 6 act on the thrust plate 3.

One of the stop zones 114 of the ramp means 111 is extended at its outer periphery by a shoulder parallel to the axis of the clutch ending in a transverse return, that is to say extending in a plane perpendicular to the axis of the clutch, provided at its periphery with a set of teeth 118.

The device for taking up wear 90 also comprises a ratchet wheel 120 with inclined teeth fixed to a shaft which also carries a worm 113; the thread and pitch of the worm 113 are adapted to the set of teeth 118 of the ramp means 111.

The axis of the ratchet wheel 120 is carried rotatably by a support 112, made of sheet metal cut out and folded, in the shape of a U having a web and two flanges intended to support the shaft.

The support 112 is extended externally in L-shaped arms each terminating in a C-shaped end 130 by means of which the support 112 is fixed to the cover by crimping to the edges of a transverse opening 106 formed in the transverse wall in of the cover 2.

The support 112 is adapted to receive an elastic member 131 in the general shape of a crosshead, each end of which is provided with an inward return; more precisely, the longer part of the crosshead carries a control tongue 135 at its end; the shorter part of the crosshead has a return 136, known as a non-return pawl, which extends roughly parallel to the control tongue 135 whilst being at a distance from it so that, when the elastic member 131 and ratchet wheel 120 are mounted in the support 112, the non-return pawl 136 and control tongue 135 each cooperate with a tooth root, the two teeth concerned here being practically diametrally opposed.

A helical compression spring is placed between the ratchet wheel 120 and support arm 112, whilst being coiled around the shaft; the worm 13 and ratchet wheel 20 are cut from the same piece.

The helical spring constitutes the elastic taking-up means; the ratchet wheel 120 is in line with the non-return pawl 136 which, by cooperation with the inclined teeth 121 on the ratchet wheel 120, prevents the ratchet wheel 120, and the worm 113, from turning in the anti-clockwise direction, as seen in the figure.

The support 112, carrying the ratchet wheel 120, the worm 113 and the helical spring, being fixed to the cover 8, the first washer 4 moves with respect to it during declutching and reclutching operations; the first washer 4 carries at its periphery a radial appendage referred to as an actuator 145 extending radially outwards in order to cooperate with the elastic member 131; it will be understood that, by virtue of this arrangement, when the first washer 4 tilts during declutching and reclutching operations, the actuator 145 moves from right to left, as seen in the figure, the control tongue 135 which, by cooperation with the teeth 121 on the ratchet wheel 120, causes the ratchet wheel 120 to rotate in the clockwise direction; when the actuator 145, in return, is moved to the right, the elasticity of the tongue 135 of the elastic member 131 and the inclination of the teeth 121 mean that this tongue 135 moves to the right whilst climbing the teeth 121, which are held fixed in rotation by the non-return pawl 136.

The device for taking up play which has just been briefly described functions as explained in the application cited above; by virtue of the taking-up device 90, the two washers 4 and 6 retain the same position, in the clutch engaged position, whatever the wear on the linings 20, 21.

The declutching device 7 is designed to counteract and overcome as required the elastic action of the Belleville washers 4, 6 with a view to releasing as required the friction linings 20, 21 of the clutch friction member 2 from between the thrust plate 3 and the reaction plate consisting of the flywheel 1 in order to disengage the clutch.

The Belleville washers 4, 6 and the elastic progressive action means 24 make it possible to grip the said linings between the plates 1, 3, the Belleville washer 4, or clamping washer, constituting axially acting clutching means forcing the thrust plate 3 in the opposite direction to the bottom 80, roughly of transverse orientation, of the cover 8. The bottom 80 is directed radially towards the axial axis of symmetry X—X of the clutch.

The clutch is here of the pushed type. It is therefore necessary to act by pushing in the direction of the arrow F on the inner end of the main part 76, with central hole, of the declutching device 7 by means of a clutch release bearing 200 carried here by the casing of the gearbox.

Thus, in FIG. 1, the clutch is in the engaged position (linings 20, 21 gripped between the plates 1, 3).

In the clutch engaged position, the declutching device 7 is in contact with the secondary stop 72 (zero clearance), whilst, during the declutching travel, the clearance between the device 7 and stop 72 increases, the declutching device 7 pivoting about the primary stop 71.

More precisely, the first Belleville washer 4, adjacent to the thrust plate 3, is the negative clamping washer, that is to say, when the height of the truncated cone (or total thickness) of the washer decreases, the load supplied by the washer decreases.

Figure 4:
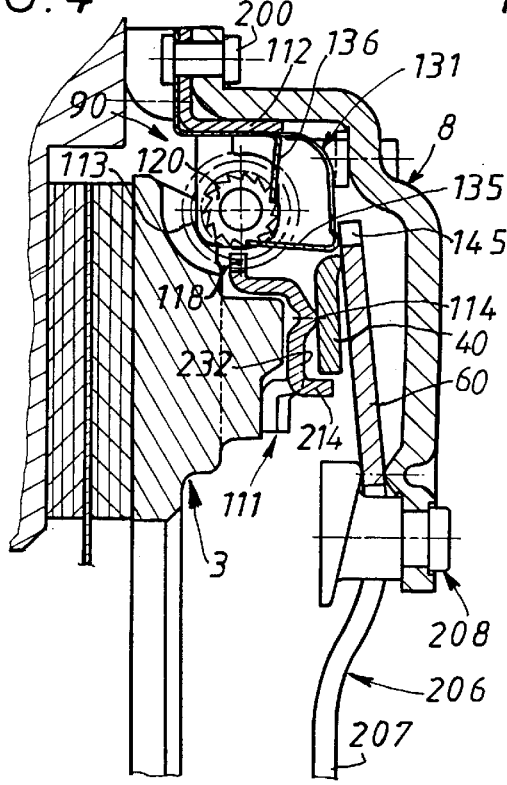
FIG. 4 is a view showing another variant clutch according to the invention.

The Belleville washer adjacent to the declutching device 7 is the positive or assistance washer. Thus, when the height of the truncated cone of the washer decreases, the load supplied by the washer increases, as can be seen in FIG. 4 of the document WO 97/19 275. This positive washer 6 has a preponderant action with respect to the negative Belleville washer 4. It is adapted to deform the latter, that is to say to flatten it. Its maximum developed load is for example greater in absolute value than the maximum load developed by the negative Belleville washer 4. Here the stiffness of the positive washer 6 is higher than the stiffness of the negative washer 4 in absolute value. According to the invention, the load/compression characteristic combining the characteristics of the assistance washer 6 and the elastic progressive action means 24 roughly follows the characteristic of the clamping washer 4.

The spring ring 5 transmits the forces between the washers 4, 6.

The declutching device 7 has a main part 76 in the form of fingers separated by slots, this main part 76 extending the peripheral parts 75.

These fingers have a greater length than the fingers of a conventional diaphragm. They can be ribbed longitudinally centrally.

The peripheral part 75 connects the fingers together and consists of a simple washer advantageously provided with blind radial slots opening out towards the outside so that this washer exerts no load or a very small load.

In this way it is possible to obtain large lever arms and reduce the load to be applied at 77 (the contact line of the clutch release bearing) in order to disengage the clutch.

The fingers of the main part 76 have a long length compared with the height of the washer 75, for example the height of the washer 75 and of the dishes 73, 74 can be such that the distance between the primary stop 71 and actuating stop 73 is one tenth of the distance between the primary stop 71 and the stop 77 for the clutch release bearing.

In the clutch engaged position, the position of the manoeuvring stop 73 is fixed since the lever constituting the declutching device 7 is in abutment on the primary 71 and secondary 72 stops of the cover 8. The secondary stop 72 therefore makes it possible to define a reference position for the declutching device 7.

The ends of the fingers 76 of the declutching device 7 therefore always occupy the same position whatever the wear on the friction linings 20, 21 and or the friction faces 10, 30.

In this position, the elastic progressive action means 24 are compressed to the maximum extent. It will be noted that the main part 76 has a fold for reducing the axial dimension.

During the declutching operation, by pushing axially by means of the clutch release bearing 200 at 77 on the inner end of the fingers of the main part 76, the declutching device 7 leaves its secondary stop 72 and a clearance appears. The manoeuvring stop 73 tends to move closer to the stop zones 114. The distance between the stop zones 114 and the manoeuvring stop 73 tends to decrease. The positive washer 6 opens, whilst the negative washer 4 closes again and the elastic progressive action means 24 relax.

Because of the stiffnesses of the washers 4, 6 and the elastic progressive action means 24, a new equilibrium is created with reduction of the load exerted by the Belleville washers on the thrust plate, the V defined by the Belleville washers 4, 6 closing up.

When the clutch release bearing 200 has effected its maximum travel, the clearance between the secondary stop 72 and the device 7 increases. The first negative Belleville washer 4 closes again, the height of its truncated cone decreases, whilst the second positive Belleville washer 6 opens, the height of its truncated cone increasing.

The loads of the two washers 4, 6 decrease greatly because the first washer 4 is negative and the second washer 6 positive.

These washers then being greatly off-load, the elastic tangential tongues then ensuring a return of the thrust plate 3 towards the bottom 80 of the cover 8. A clearance therefore appears between the thrust plate 3 and the linings 20, 21.

It will be noted that an annular abutment 32 is formed on the back face 36 of the thrust plate 2, here by moulding. This abutment 32 prevents the first Belleville washer 4 from turning, which would cause an increase in the load exerted on the thrust plate 3, and an unbalancing or even re-engagement of the clutch. Thus anti-turning means are associated with the first Belleville washer 4, which consequently is mounted under prestressing.

Naturally, for safety reasons, an abutment can be provided for limiting the travel of the declutching device 7 so as to prevent the second washer 6 coming under load again because the first washer 4 is in content with the stop 32.

Thus the declutching device 7 can carry small columns passing through openings formed in the bottom 80 of the cover 8. The head of the small columns then comes into contact with the face of the bottom 80 turned in the opposite direction to the thrust plate 3.

In the clutch engaged position, the declutching device 7 always has the same position whatever the degree of wear on the friction linings and/or friction faces.

As will have been understood, the spring ring 5 constitutes a force transmission means of rounded shape. As a variant, this spring ring can be replaced by a rounded dish formed at the inner periphery of one of the Belleville washers 4, 6.

This dish has for example a shape similar to that of the stops 71 to 73. The force transmission means can therefore have different shapes.

The thrust plate 3 has at its front a friction face 30 for cooperating with the clutch friction member 2. The rear face of the thrust plate, directed axially towards the bottom 80 of the cover 8, is shaped so as to form an abutment 32 limiting the inclination of the negative Belleville washer 4.

This abutment 32, obtained by casting, is located radially underneath the stop zones 114, having a height less than these.

The Belleville washers 4, 6, the device for taking up wear 90 and the declutching device 7 are interposed between the cover 8 and thrust plate 3 in order to form with these a manipulatable and transportable unitary assembly referred to as the clutching mechanism. It is this clutching mechanism which is fixed to the flywheel for driving in rotation 2.

As a variant, the washer 75 can be given a small degree of elasticity in order to improve comfort at the pedal controlling the clutch release bearing and to exert a return action.

More stiffness can be given to the positive Belleville washer 6 by increasing for example its thickness compared with the negative Belleville washer 4. It is possible to act on the angle of the truncated cone of the Belleville washers 4 and 6 or any other means so that the positive Belleville washer 6 is preponderant. The two Belleville washers 4 and 6 can be conventional Belleville washers or Belleville washers having fingers at their inner and/or outer periphery, according to the characteristics required for each application.

The positive Belleville washer 6 can be replaced by any other washer having a similar linear characteristic. Thus the positive washer 6 can be an axially acting corrugated washer. The definition positive Belleville washer therefore encompasses this type of variant.

The clutches depicted partially in FIGS. 2 to 5 are of the type depicted in FIGS. 1 to 4 of the French patent application filed on Apr. 7, 1997 under the number 97 04 214, the corresponding description of which forms part of the application.

Figure 2:
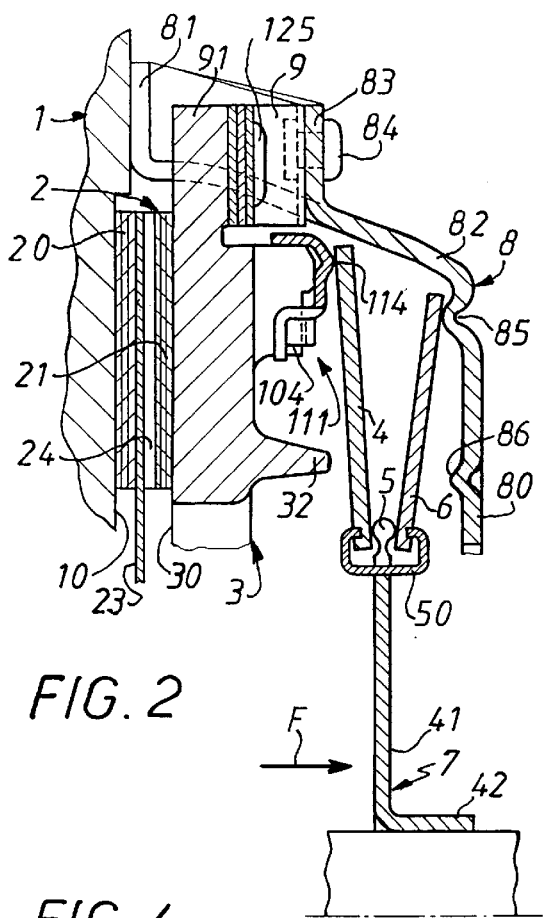
FIGS. 2 and 3 are views similar to FIG. 1 showing a variant clutch according to the invention.
Figure 3:
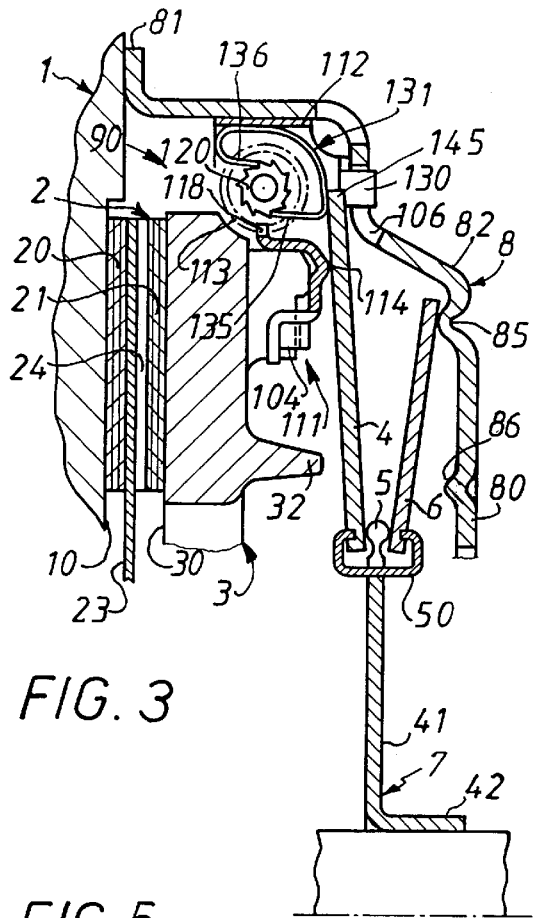

According to the variant in FIGS. 2 and 3, the declutching device 7 comprises a transverse plate 41 carrying at its outer periphery the annular force transmission spring ring 5; the transverse plate 41 is connected by its inner periphery to a sleeve 42 mounted so as to slide axially.

This declutching device 7 is designed to counteract and overcome as required the elastic action of the Belleville washers 4 and 6 with a view to releasing as required the friction linings 20, 21 and the clutch friction member 2 from between the thrust plate 3 and reaction plate 4 in order to disengage the clutch.

The sleeve 42 of the declutching device 7 can be moved, for the purpose of the declutching operation, in one direction or the other, that is to say in the direction of the arrow F, the clutch being of the pulled type, or in the opposite direction to that of the arrow F, the clutch being of the pushed type: this depends on the choice of the relative characteristics of the first 4 and second 6 Belleville washers.

FIG. 2 shows the case of a pushed clutch, that is to say declutching is obtained by acting, at the sleeve 42, in the opposite direction to that of the arrow F; the second Belleville washer 6 is here the positive or assistance washer and the first washer 4 is the negative or clamping washer.

In FIG. 2, the clutch is shown engaged under the load of the second Belleville washer 6, transmitted to the thrust plate 3, via the force transmission means 5, here in the form of a spring ring, by the first Belleville washer 4 in abutment through its outer periphery on the stop zones 114 and through its inner periphery on the annular abutment 32.

When there is an action on the sleeve 42 in the opposite direction to that of the arrow F, the positive washer 6 is in some way compressed, its exerted load increasing and its inner periphery being brought closer to the bottom 80 of the cover 8; this compression is assisted by the clamping washer 4, which releases the energy stored, in the engaged position, under the effect of the preponderant positive washer 6, during the clutching operation. The compression travel of the positive washer 6 is limited at the declutching device 7 or, as depicted, by a dish 86 on the bottom 80 of the cover 6 with which the positive washer 6 comes to cooperate at the end of the declutching operation.

It will easily be understood that, in order to produce a clutch of the pushed type, that is to say in which the declutching operation is obtained by acting on the sleeve 42 in the opposite direction to that of the arrow F, it suffices to exchange the characteristics of the washers 4 and 6: according to this variant, therefore, not shown, the first Belleville washer 4 is the assistance washer and the second Belleville washer 6 is the clamping washer. Here, in the clutch engaged position, the first washer 4 is at a distance from the annular abutment 32 and the second washer 6 is an abutment at the same time on the dishes 85 and 86 on the bottom 80 of the cover 8; the annular abutment 32 here fulfills the role of declutching travel limitation.

In these figures there are visible the tangential tongues 9, and the rivets 84 and 125 for fixing them, as well as the lugs 91, in radial projection, on the thrust plate. In these figures, the device for taking up wear 90 is identical to that of FIG. 1.

According to the variant in FIG. 4, the second elastic washer 60, the one furthest away from the thrust plate 3, is the outer peripheral part of a diaphragm 206 extended inwards by a central part 207 divided into radio fingers forming the declutching device; the diaphragm 206 is mounted articulated on the cover 8 in a conventional fashion by virtue of small columns 208, the clutch here being of the pushed type. The second Belleville washer 60 is therefore the clamping washer and the first Belleville washer 40 the assistance washer.

In FIG. 4, the pieces or parts of the pieces identical to, or fulfilling the same role as, those of the previous variant bear the same references.

Here, it is the second Belleville washer 60 which carries the actuator 145, in the form of a radial appendage for actuating the control tongue 135 of the elastic member 131 of the device for taking up wear 90; here, the non-return pawl 36 and tongue 135 are disposed roughly orthogonally; the support 112 and elastic member 131 are fixed to the cover 8 by rivets 200.

Here, the first washer 40 and second washer 60 are inclined in opposite directions compared with the variant of FIGS. 2 and 3 and therefore bear on each other through their outer periphery. It is in the vicinity of its median part that the first washer 40 cooperates with the stop zones 114 of the sheet metal annulus of the ramp means 111; here, the said annulus has a cylindrical axial shoulder 214 directed towards the bottom of the cover 8 and centring the first washer 40 by the inner periphery thereof; the transverse flank 232, bordered on one side by the stop zones 114 and one the other side by the axial shoulder 214, limits the tilting of the first washer 40 at the time of declutching; here, the second washer 60 is the clamping washer and the first washer 40 the assistance washer.

Figure 5:
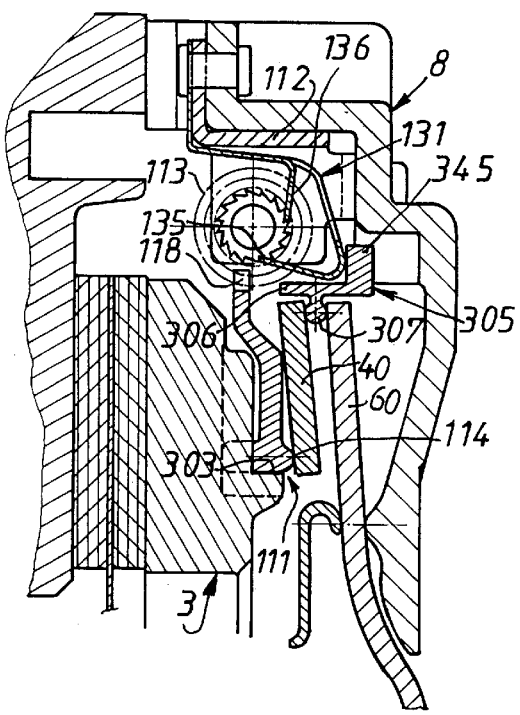
FIG. 5 is a view showing yet another variant clutch according to the invention.

According to the variant depicted in FIG. 5, the second washer is also, as in the variant in FIG. 4, formed by the outer peripheral part of a diaphragm extended inwards by a central part divided into radial fingers by slots, and the clutch is of the pushed type. The first Belleville washer 40 is therefore the assistance washer and the second Belleville washer 60 the clamping washer.

Compared with the variant in FIG. 4, here force transmission means 305 are provided and have an annular cylindrical skirt 306 to which there is attached internally a spring ring 307 interposed between the washers 40 and 60 at their outer periphery; the skirt 306 centres the first washer 40 with respect to the second washer 60, itself positioned by the diaphragm to which it belongs, the diaphragm being positioned conventionally by virtue of small columns fixed to the cover and not visible in the Figure.

Here it is the skirt 306 which, at its external part on the cover side, carries the actuator 345, in the form of a radial appendage, in order to actuate the tongue 135 controlling the elastic member 131 of the device for taking up wear.

Here the sheet metal annulus of the ramp means 111, which carries the teeth 118, is centred at its inner periphery by a cylindrical step 303 formed in the thrust plate 3; the said annulus has, towards its inner periphery on the cover side, the stop zones 114 with which the first washer 4 cooperates through its inner periphery.

Naturally it is possible to use other types of declutching device 7, such as those described for example in FIGS. 3 and 4 of the French patent application filed on Apr. 7, 1997 under the number 97 04 213, whose corresponding description forms part of the present application.

According to the variant in FIG. 3 of this prior application, the declutching device comprises an annular disc carrying in its radially median part, for example by riveting, the force transmission means 5; the clamping and assistance Belleville washers are placed on each side of the annular disc; the latter also has at its outer periphery lugs passing through openings formed in the cylindrical peripheral skirt 82 of the cover 8; these lugs are adapted to bear on an edge of these openings when the adjacent part of the inner periphery of the annular disc is moved axially by the declutching stop 200, from right to left as seen in the figure, for the purpose of effecting the declutching operation, the clutch being shown as the pushed type.

It would of course be possible, as previously, by reversing the role of the washer, to produce as a variant a clutch of the pulled type having a declutching device in the form of a disc, such as this one.

According to the variant depicted in FIG. 4 of this prior application, the declutching device comprises a disc having a central part in the form of fingers separated by slots, this central part extending a peripheral annular part. These fingers can be ribbed longitudinally centrally. The annular part connects the fingers things together and consists of a simple washer, optionally provided with blind radial slots opening out towards the outside so that this washer exerts no load, or a very low load, axially.

As a variant, a low elasticity can be given to the peripheral part in order to improve comfort at the pedal controlling the clutch release bearing 200 and to exert a return action.

The disc is mounted so as to be articulated at the inner periphery of the bottom 80 of the cover 8, between two supports, one in the form of a spring ring, the other in the form of a dish on the bottom 80 of the cover 8, between which it is held by virtue of folded-over lugs on the cover; thus the disc is mounted so as to be articulated like a clutch diaphragm. In this figure, as the clutch release bearing 200 is depicted, the clutch is of the pulled type but naturally, as explained above, it could easily be transformed into a pushed clutch, by exchanging the washers.

What is claimed is:

1. Friction clutch, having a clutch friction member (2) and a clutching mechanism having a cover (8) with a transversely oriented bottom (80) and fixing means (81) for fixing the clutching mechanism to a flywheel (1) driving in rotation, a thrust plate (3) having at the front a friction face (30) for cooperating with the clutch friction member (2), elastic tongues (9) for connecting the thrust plate (3) with the cover (8) with respect to rotation, with axial mobility, and, interposed between the back face (36) of the thrust plate (3) and the bottom (80) of the cover (8), on the one hand axially acting elastic clutching means (4, 60) axially forcing the thrust plate (8) in the opposite direction to the bottom (80) of the cover (8) and on the other hand a declutching device (7) for counteracting the action of the said elastic clutching means (4, 60) as required and moving the thrust plate in the direction of the bottom (80) of the cover (8) over a plate lifting distance, the clutching mechanism being equipped with a device for taking up wear (90) on at least one of the linings of the clutch friction member (2) and elastic assistance means (6, 40) for assisting the declutching force, elastic progressive action means (24) being mounted within the clutch friction member (2) and acting axially only on a travel of the thrust plate, characterised by the fact that the elastic assistance means (4) are mounted outside the clutch friction member (2) and the load/compression characteristic combining the load/compression characteristics of the elastic assistance (6, 40) and progressive action (24) means follows overall the load/compression characteristic of the axially acting elastic clutching means (4, 60).

2. Clutch according to claim 1, characterised by the fact that the elastic clutching means (4, 60) and the elastic assistance means (6, 40) each consist of a Belleville washer, the two Belleville washers being mounted in series and placed axially between the thrust plate (3) and the bottom (80) of the cover (8).

3. Clutch according to claim 2, characterised by the fact that a first Belleville washer (4) is referred to as the negative Belleville washer (4), its supplied load decreasing when the height of its truncated cone decreases, and a second Belleville washer (6) is referred to as the positive Belleville washer, its supplied load increasing when the height of its truncated cone decreases.

4. Clutch according to claim 3, characterised by the fact that the thrust plate (3) has at its rear an abutment (32) situated radially below stop zones (114) in order to limit the inclination of the first Belleville washer (4).

5. Mechanism according to claim 1, characterised by the fact that a force transmission means (5) are interposed between the inner peripheries of the first (4) and second (6) Belleville washers.

6. Mechanism according to claim 2, characterised by the fact that the Belleville washers (4, 6) are maintained in contact with the force transmission means (5) by an elastic clamp (50), coming into engagement with the external faces of the Belleville washers (4, 6).

7. Clutch according to claim 2, characterised by the fact that the declutching device (7) is annular in shape and the two Belleville washers (4, 6) are mounted in series between the thrust plate (3) and a manoeuvring stop (73) carried by the declutching device (7) which is mounted at its outer periphery so as to pivot on a primary stop (71) carried by the bottom (80) of the cover (8) radially above the manoeuvring stop (73), itself located radially above a secondary stop (72) carried by the bottom (80) of the cover (8).

8. Clutch according to claim 7, characterised by the fact that, the device for taking up wear (90) having ramp means (111) with ramps disposed circumferentially and stop zones (114), the first Belleville washer (4) is in contact at its outer periphery with the stop zones (114), whilst the second Belleville washer (6) bears at its outer periphery on the manoeuvring stop (73), said washers (4, 6) being inclined in the opposite direction.

9. Clutch according to claim 7, characterised by the fact that the declutching device (7) has a peripheral part (75) of annular shape extended by a main part (76) divided into radial fingers by slots.

10. Clutch according to claim 9, characterised by the fact that the manoeuvring stop (73) is formed by stamping and is connected to the inner periphery of the annular peripheral part (75) of the declutching device (7) by a dish (74) directed axially in the opposite direction to the manoeuvring stop (73).

11. Clutch according to claim 9, characterised by the fact that the peripheral part (75) of the declutching device (7) is offset axially with respect to its main part.

12. Clutch according to claim 7, characterised by the fact that the primary stop (71) is offset axially with respect to the secondary stop (72).

13. Clutch according to claim 5, characterised by the fact that the force transmission means (5) consist of a spring ring.

14. Clutch according to claim 2, characterised by the fact that, the device for taking up wear (90) having ramp means (111) with ramps disposed circumferentially and stop zones (114), the first Belleville washer (4) is in contact with the stop zones (114), whilst the second Belleville washer (6) bears on the cover (8).

15. Clutch according to claim 14, characterised by the fact that the first washer (4) is in contact through its outer periphery with the stop zones (114) whilst the second washer (6) bears through its outer periphery on the cover (8).

16. Clutch according to claim 14, characterised by the fact that a force transmission means (5) is carried by the declutching device (7).

17. Clutch according to claim 14, characterised by the fact that the first washer (40) is in contact through its median part with the stop zones (114) whilst the second washer (60) bears through its inner periphery on the cover (8).

18. Clutch according to claim 14, characterised by the fact that the first washer (40) is in contact through its inner periphery with the stop zones (114) whilst the second washer (60) bears through its inner periphery on the cover (8).

19. Clutch according to claim 14, characterised by the fact that the bottom (80) of the cover (8) carries an abutment (86) for limiting the inclination of the second Belleville washer (6).

20. Clutch according to claim 14, characterised by the fact that the second elastic washer (60) is an outer peripheral part of a diaphragm (206) extended inwards by a central part (207) divided into radial fingers by slots.

21. Clutch according to claim 14, characterised by the fact that the declutching device (7) comprises a transverse plate (41) carrying at its outer periphery the force transmission means (5) and connected by its inner periphery to a sleeve (42) mounted so as to slide axially.

22. Clutch according to claim 14, characterised by the fact that the declutching device (7) comprises an annular disc (61) carrying in its radially median part the force transmission means (5) and having, at its outer periphery, lugs (62) passing through openings (18) formed in a cylindrical peripheral skirt (82) on the cover (8), the lugs (62) on the annular disc (61) being adapted to bear on an edge of these openings (18) when the adjacent part of its inner periphery of the annular disc (61) is moved axially.

23. Mechanism according to claim 14, characterised by the fact that the declutching device (7) comprises a disc (75) having an annular part (72) extended towards the axis by a central part (76) divided into radial fingers by slots, the force transmission means (5) being placed at the outer periphery of said annular part (72), itself mounted so as to be articulated at the inner periphery of the bottom (80) of the cover (8).

24. Clutch according to one of claim 1, characterised by the fact that the device for taking up wear (90) is actuated by the elastic clutching means (4, 60).

25. Clutch according to one of claim 5, characterised by the fact that the device for taking up wear (90) is actuated by the force transmission means (305).

* * * * *